(12) United States Patent
Calcatera et al.

(10) Patent No.: US 6,570,750 B1
(45) Date of Patent: May 27, 2003

(54) SHUNTED MULTIPLE THROW MEMS RF SWITCH

(75) Inventors: Mark C. Calcatera, Centerville, OH (US); Christopher D. Lesniak, Centerville, OH (US); Richard E. Strawser, Greenville, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/552,030

(22) Filed: Apr. 19, 2000

(51) Int. Cl.$^7$ ................................................ H01H 73/00
(52) U.S. Cl. ..................... 361/115; 361/58; 361/113; 361/152; 361/160
(58) Field of Search ................. 361/212, 115, 361/58, 234, 220, 160, 152, 113

(56) References Cited

U.S. PATENT DOCUMENTS

| | | |
|---|---|---|
| 4,581,624 A | 4/1986 | O'Connor |
| 4,651,564 A | 3/1987 | Johnson et al. |
| 4,674,180 A | 6/1987 | Zavracky et al. |
| 4,882,933 A | 11/1989 | Petersen et al. |
| 4,959,515 A | 9/1990 | Zavracky et al. |
| 5,096,279 A | 3/1992 | Hornbeck et al. |
| 5,578,976 A | 11/1996 | Yao |
| 5,654,819 A | 8/1997 | Goossen et al. |
| 5,846,849 A | 12/1998 | Shaw et al. |
| 5,880,921 A | 3/1999 | Tham et al. |
| 6,028,343 A | 2/2000 | Chan et al. |

*Primary Examiner*—Stephen W. Jackson
(74) *Attorney, Agent, or Firm*—Gerald B. Hollins; Thomas L. Kundert

(57) ABSTRACT

A micromechanical electrical systems (MEMS) metallic micromachined multiple ported electrical switch receivable on the die of an integrated circuit and within the integrated circuit package for controlling radio frequency signal paths among a plurality of switch-enabled different path choices. The switch provides desirably small signal losses in both the switch open and switch closed conditions. The switch is primarily of the single pole multiple throw mechanical type with possible use as a single input pole, multiple output poles device and provision for grounding open nodes in the interest of limiting capacitance coupling across the switch in its open condition. Cantilever beam switch element suspension is included along with normally open and normally closed switch embodiments, electrostatic switch actuation and signal coupling through the closed switch by way of increased inter electrode capacitance coupling. Switch operation from direct current to a frequency above ten gigahertz is accommodated.

19 Claims, 3 Drawing Sheets

SHUNTED MULTIPLE THROW MEMS RF SWITCH

CROSS REFERENCE TO RELATED PATENT DOCUMENT

The present document is somewhat related to the copending and commonly assigned patent application document "SERIES AND SHUNT MEMS RF SWITCH", application Ser. No. 09/552,547, filed of even date herewith. The contents of this related application are hereby incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

This invention relates to the field of small mechanical metallic electrical switches, i.e., micromechanical electrical switches (MEMS) of the type usable for low loss, multiple alternate circuit path-selecting, switching in a radio frequency integrated circuit device.

In view of the signal power losses often encountered with semiconductor switch devices in electronic systems operating in the microwave and gigahertz spectral regions (i.e., losses occurring in both the open and closed switch conditions) it is frequently desirable to resort to simple mechanical switching devices to accomplish signal path changes in such systems. This selection is frequently complicated however by the need to accomplish switching within the package of an integrated circuit device and in an environment wherein signals are communicated along paths comprising an electrical transmission line. Further complications arise from the often needed high operating speed combined with need for a long operating life from such switches and from the need to employ switch fabrication materials compatible with the processing steps and the specific materials used during wafer fabrication for an integrated circuit device. The actuation mechanism for such switching devices gives rise to additional areas of focus since clearly the magnetic actuation arrangements frequently used in other switching environments is all but unavailable in the limited space and limited materials environments of an integrated circuit device.

The present invention is believed to offer a mechanical switching device of the MEMS i.e., micromechanical electrical systems type, a multiple throw switch accommodating several of these complications, providing low switch input to output stray coupling and advancing the art of MEMS integrated circuit switching to a new level.

SUMMARY OF THE INVENTION

The present invention provides a die mounted externally controllable microminiature electrically energized electrical switch or relay usable within the circuitry of an integrated circuit die, and mounted within the integrated circuit package, for multiple circuit path changing purposes.

It is an object of the present invention therefore to provide an integrated circuit-compatible multiple path metallic electrical switch.

It is another object of the present invention to provide an integrated circuit-compatible metallic electrical switch of the single pole, two, three or more throws type.

It is an object of the present invention to provide an integrated circuit-compatible metallic electrical switch of the shunted single pole, single, two, three or more throws type.

It is an object of the present invention to provide an integrated circuit-compatible metallic electrical switch having any of multiple switch nodes selectably connectable with either another switch node or a signal grounding shunt.

It is an object of the present invention to provide an integrated circuit-compatible metallic electrical switch of the single pole multiple throw and either normally open or normally closed type.

It is an object of the present invention to provide an integrated circuit-compatible metallic electrical switch of the single pole multiple throw type which may be operated in a semi multiple pole mode.

It is another object of the invention to provide an electrically controllable electrical switch, a switch having certain attributes of an electrical relay or stepping switch.

It is another object of the invention to provide a multiple pole electrical switch having compatibility with the components and processes used in an integrated circuit device.

It is another object of the invention to provide an electrical switch suited to the diversion of radio frequency electrical energy among multiple paths in an integrated circuit die.

It is another object of the invention to provide a multiple node electrical switch suited for use in an integrated circuit electrical transmission line environment.

It is another object of the invention to provide an electrical switch employing either of metallic connection or capacitance coupling connection between "closed" contacts of the switch.

It is another object of the invention to provide an electrical switch wherein one of the input or output contacts is multiple in nature.

It is another object of the invention to provide an electrical switch having fixed and plural movable metallic members, members all formable with integrated circuit processing techniques.

It is another object of the invention to provide an electrical switch having movable members physically restrained in each of their open and closed operating positions.

It is another object of the invention to provide a multiple node integrated circuit electromechanical switch having physical components operating life measured in the ten to the ninth power cycles and greater range.

It is another object of the invention to provide a multiple node metallic element electrical switch having operating cycle times measured in the range of microseconds.

It is another object of the invention to provide a multiple node electrical switch in which capacitance coupling through open state nodes is minimized.

It is another object of the invention to provide a multiple node electrical switch in which capacitance coupling between switch-open nodes is minimized through shunt grounding of movable switch elements in the open-switch condition.

It is another object of the invention to provide a integrated circuit-compatible multiple node micro electromechanical systems (MEMS) switch.

It is another object of the invention to provide a micro electromechanical systems (MEMS) switch of the multiple node micromachined electromechanical radio frequency type.

It is another object of the invention to provide a multiple node MEMS electrical switch having improved isolation, low electrical loss, high operating speed, low activation voltage and improved manufacturability.

It is another object of the invention to provide a multiple node MEMS electrical switch having decreased insertion loss and improved isolation at frequencies above 1 gigahertz in comparison with a comparable transistor switch.

Additional objects and features of the invention will be understood from the following description and claims and the accompanying drawings.

These and other objects of the invention are achieved by the method of performing electrical switching in a metallic conductor signal path of a radio frequency integrated circuit electrical device, said method comprising the steps of:

disposing an electrical switching assembly at an angular junction multiple conductor fan-out position along a metallic transmission line signal path in said radio frequency integrated circuit electrical device;

holding a spring urged movable metallic portion of each conductor in said multiple conductor fan-out position of said electrical switching assembly in a relaxed minimal spring tension first switching condition during quiescent state intervals of said electrical switching assembly;

changing one spring urged movable metallic conductor portion in said multiple conductor fan-out position of said electrical switching assembly into a stressed greater spring tension transient state second switching condition during selected transient actuated switch operating intervals of said electrical switching assembly;

changing said movable metallic conductor portion switching position against spring tension into said stressed greater spring tension transient state second switching condition using electrostatic force generated by an electrical potential switch control signal;

limiting spring tension urged movable metallic conductor movement arc length and movable metallic conductor element spacing gap in said electrical switching assembly during a relaxation from said second switching condition to said first switching condition using a metal stopping member selectively disposed along a switch position-changing swing path of said movable metallic conductor;

coupling radio frequency electrical signal between said movable metallic conductor-electrical switching member and a switch output conductor member using one of capacitance and ohmic coupling between said switching member and a switch output conductor member in one of said first and second switching conditions;

limiting capacitance electrical signal coupling between said movable metallic conductor electrical switching member and said switch output conductor member by one of capacitance coupled and ohmic contact grounding of said movable metallic conductor electrical switching member to a zero electrical potential metal stopping member in a remaining of said first and second switching conditions;

said first and second switching conditions comprising one of:

normally open condition in said electrical switching assembly including lowest capacity coupling between said movable metallic conductor electrical switching member and said switch output conductor member plus concurrent grounding by one of capacitance coupled and ohmic contact grounding of said movable metallic conductor member to said zero electrical potential metal stopping member; and a normally closed condition in said electrical switching assembly including greatest capacity coupling between said movable metallic conductor electrical switching member and said switch output conductor member plus actuated switch grounding by one of capacitance coupled and ohmic contact grounding of said movable metallic conductor member to said zero electrical potential metal stopping member;

repeating said step of changing one spring urged movable metallic conductor portion in said multiple conductor fan-out position of said electrical switching assembly into a stressed greater spring tension transient state second switching condition using a selected one of said spring urged movable metallic conductor portions.

DETAILED DESCRIPTION

Figure 1:
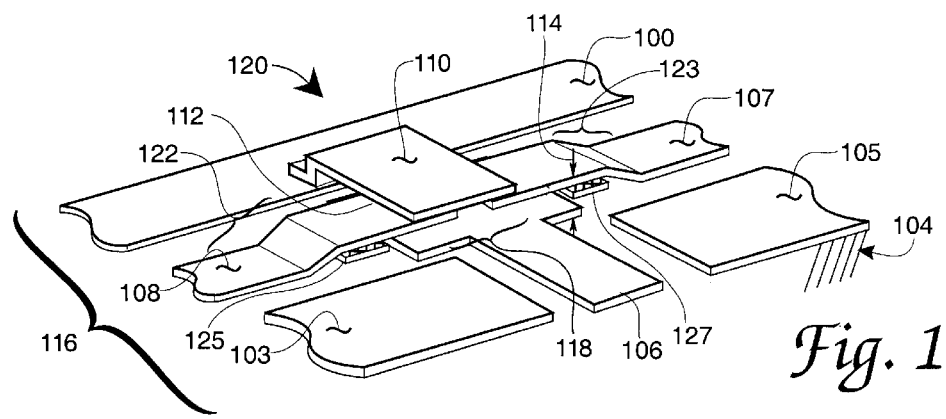
FIG. 1 shows a three dimensional perspective view of a multiple node MEMS integrated circuit electrical switch according to the present invention.

Multiple path, multiple option or multiple node switching, such as is provided by a single pole four throw mechanical switch or a stepping switch, for examples, is also a desirable capability for use in the microwave or gigahertz range of radio frequencies. Such switching is also desirable within the confines of an integrated circuit package used to realize circuits operating in this frequency range. In this range of frequencies such a switch may be embodied into a transmission line structure and configured to maintain, to the best degree possible, a constant characteristic impedance such as fifty ohms when disposed in any of its multiple circuit path-selecting conditions.

Radio frequency switches of this nature may be used for such purposes as selecting different signal gain paths within a circuit, applying different loads to an amplifier for impedance matching or other purposes, selecting different filter network characteristics, choosing differing phase shift or delay signal paths, for electronic beam steering antenna switching and for switching between transmit and receive modes in a radio frequency transceiver. Switching of this nature may be accomplished using transistor or diode-inclusive networks; however, as noted more precisely below herein, such semiconductor device arrangements provide less than optimum electrical characteristics when impressed with signals of these frequencies. In at least some applications of switches of this nature therefore the movable contact electromechanical switch remains a viable option for securing best achievable performance multiple path switching.

The characteristics of such a multiple path radio frequency electrical switch are often significant to the switch's operating environment when the switch is disposed in each of its possible different operating conditions, states or configurations. A mechanical radio frequency electrical switch for example should provide high isolation between the movable or lever switch element and the multiple fixed position switch elements when the switch is positioned in the open circuit or "Off" state and should additionally provide low insertion losses between movable or lever switch element and a fixed position element when disposed in each possible closed or "On" state of the switch.

Radio frequency switches using transistors or diodes similarly have both "Off" and "On" state characteristics of concern in many switch applications. Such semiconductor switches, even though often less than ideal, are widely employed in microwave and millimeter wave integrated circuits also in applications such as signal routing and impedance matching networks. In applications above one gigahertz in operating frequency however, solid state switches have unduly large insertion losses, losses in the order of 1 dB, in the "On" state and poor isolation in the "Off" state, typically isolation no better than −30 dB, and are somewhat fragile in their ability to tolerate electrical and physical abuses. MEMS radio frequency switches, i.e., micromechanical electrical systems radio frequency switches as discussed in the present document, are a significantly lower loss alternative to such diode and transistor semiconductor switches for many switching applications above 1 GHz.

The multiple path electromechanical switch of the present invention is considered primarily to comprise a switch of the single pole multiple throw type, for example a switch of the above cited single pole four throw type. As will doubtless become apparent to persons skilled in the electrical art however the described switch geometry is in itself not limited to this single pole four throw or single pole multiple throw usage. The disclosed switch may for example lend to applications requiring an input signal be electively connected concurrently to any of one, two, three or four or more switch output signal paths, e.g., be of a single input pole four output poles configuration (or the related inverse input/output configuration). In the contemplated microwave or gigahertz radio frequency signal range of switch operating frequencies however it is most common to be concerned with signal power considerations such as transferring the maximum power available at the output port of one amplifier stage along a transmission line to the input port of a following amplifier stage.

In this frequently encountered efficient power transfer-considered signal environment there is little need for dividing the power available at the output port of a signal source into smaller portions for use in multiple succeeding stages, especially for accomplishing such signal power division within a switching device. It is this power-considered practical consideration which therefore limits probable use of the present invention switch and influences the present disclosure of the switch to the single pole input, single pole output switch configuration. For other uses of the present invention switch, uses with direct current or lower frequencies wherein for example the transmission line complication of signal ground conductors being interposed between switch signal conductors is not required, the present invention switch may in fact be useful in the single input pole, multiple output poles configuration.

MEMS STRUCTURE

FIG. 1 in the drawings therefore shows a three dimensional perspective view of a first multiple path MEMS metallic integrated circuit electrical switch according to the present invention. In the FIG. 1 switch, grounded metallic conductors 100, 103 and 105 of a transmission line assembly 116, a "coplanar transmission line" form of transmission line, are shown disposed across the surface of a substrate-supported multiple layer integrated circuit die of a semiconductor wafer. In the FIG. 1 drawing the substrate and its overlaying multiple layers of semiconductor materials (usually containing transistors and other electronic hardware apparatus) are indicated generally at 104. The conductors 100, 103 and 105 may comprise any of numerous conductor types known in the art for use in integrated circuit devices; these conductors may for example be made from such integrated circuit metallization materials as aluminum, gold, titanium, platinum and copper.

Three additional metallic conductors of the FIG. 1 transmission line assembly 116, i.e., switch input and output path signal conductors, are shown at 106, 107 and 108 in the FIG. 1 drawing. These signal conductors may be made of the same materials as the conductors 100, 103 and 105. The switch output conductors 107 and 108 may be disposed in axial alignment with each other and located centrally intermediate the grounded conductors 100, 103 and 105 to comprise the coplanar transmission line structure. In the conductor disposition shown in FIG. 1 the output conductors 107 and 108 overlap the input conductor 106 in their endmost, or switch portion at 118. As shown in FIG. 1 these input and output conductors are separated by a distance such as two to five microns in the vertical direction indicated by the gap 114. In this separated conductor condition the FIG. 1 switch 120 is of course in the electrically "Off" condition. Additionally shown in the FIG. 1 drawing is a cantilever bridge member or raised metallic bridge, or upper air bridge, or microbridge-short or more simply the backstop member 110 extending from the metallic transmission line ground conductor members 100 over the switching portions at 118. The metallic backstop member 110 is connected to a signal ground node in the FIG. 1 integrated circuit by way of the grounded transmission line conductor 100.

In the FIG. 1 position of the switch 120, the movable arm portions at movable arm portion 122 and 123 are shown in contact with the backstop member 110 and these arm portions are therefore held in the zero volt signal condition. This movable arm portions 122 and 123 of conductors 107 and 108 may be connected to either a source of radio frequency signal during use of the FIG. 1 switch or may be connected to input nodes of some portion of the integrated circuit electrical apparatus such as to input ports of radio frequency amplifier circuits. In both of these connections the grounded movable arm portion 122 of conductors 107 and 108 serves a useful purpose in limiting or eliminating capacitance coupling effects between the conductors 106 and conductors 107 and 108 while the switch is disposed in the FIG. 1 open switch status. In the former source connected to conductors 107 and 108 switch configuration the grounded movable arm portion of the conductors 107 and 108 provides a shunt loading of the signal source connected to the movable arm portions 122 and 123 while in the latter source connected to conductor 106 configuration grounding the movable arm portions 122 and 123 and the input nodes of some elements of the integrated circuit electrical apparatus can preclude stray signal coupling into amplifier input ports and other undesirable operating conditions.

Maintenance of the FIG. 1 switch in the illustrated open configuration is preferably accomplished through action of spring tension resident in the movable arm portions 122 and 123 of the conductors 107 and 108 from the time of fabrication. Such metal conductors can be fabricated by metal deposition techniques known in the art using photoresist masking, masking which may be formed in several layers to realize the multiple layers present in the FIG. 1 switch central region at 118. Such metal deposition fabrication of the movable arm portions 122 and 123 of the conductors 107 and 108 tends to leave residual stress in the deposited metal, stress which causes the conductor of the movable arm portion 122 for example to curl into an upward directed condition if not otherwise restrained—as appears in the FIG. 3 drawing herein and is additionally discussed below herein. The spring tension of this curling therefore provides a useful function in the present invention by urging the movable switch arms into the backstop-contacting quiescent state shown in FIG. 1. The backstop member 110 also limits the amount of vertical deflection experienced by the cantilever beam movable arm portions 122 and 123 and hence the length of the separation gap 114 and therefore allows for a low dc switch actuation voltage.

Control of residual stress in the movable arm portions 122 and 123 is a characteristic to be considered in fabricating the FIG. 1 switch. In addition to other involved factors, higher residual stress in each cantilever beam shortens the release time of the switch, and enables faster switching speed. Residual stress in a cantilever beam is also believed a contributor to determination of achievable operating life in a fabricated switch. Switches employing the dimensions disclosed in connection with FIG. 2 herein have for example been found capable of operating life in excess of 10E9 or $10^9$ operating cycles and an operating life in the 10E12 cycle range is believed possible. Such techniques as selecting physical dimensions of the movable arm portions 122 and 123, selecting the metals employed and controlling the deposition conditions may be used in selecting the residual stress achieved in a particular embodiment of the switch invention.

The electrostatically actuated MEMS switch of the present invention therefore relies on residual stress in the movable arm portions 122 and 123, and the spring constant of movable arm portions 122 and 123, to relax the switch when the dc actuation voltage is removed. Since the force developed by the spring characteristics of the movable arm portions 122 and 123 must be overcome by the switch actuating electrostatic force in closing the FIG. 1 switch, low actuation voltage switches tend to call for a low spring constant and, in the absence of any compensating factors, incur the "expense" of slower release time characteristics. The herein disclosed arrangement of the present invention switch however emphasizes the use of greater metal stress to provide a high spring constant and fast release time, with the backstop member 110 then offering lowered dc actuation voltages by way of switch gap limitation and also providing high signal isolation between switch contacts.

Since the selection of switch element physical dimensions is also a consideration in determining the characteristic impedance of the FIG. 1 switch, as is discussed in another later portion of this specification, techniques involving a multiple variable approach and inclusion of these several dimension-determining influences are appropriate to final determination of switch element dimensions. Compromise, as is known in the art, between these several dimension-determining influences is possibly appropriate in determining optimum switch dimensions for a given application.

The gap 114 between movable arm portions 122 and 123 and fixed position conductor 106, i.e., the gap between switch input and output conductors in the FIG. 1 drawing, relates to several additional significant characteristics of the FIG. 1 switch. One of these characteristics concerns the effective capacitance coupling present between each of conductors 107 and 108 and conductor 106 when the switch is in the FIG. 1 open state. Notwithstanding the desired ohmic grounding of the movable arm portions 122 and 123 of the switch 120 by way of the backstop member 110 as described above, capacitance coupling between switch input and output conductors is nevertheless present. When these conductors 107 and 108 are connected as switch output conductors small signals may be present on each conductor as a result of non zero effective impedance in the backstop member 110 ground circuit and the relatively high, gigahertz, frequencies contemplated for the FIG. 1 switch.

Conversely if the conductors 107 and 108 are connected as switch input conductors, and are thereby driven by the output signals of some part of the integrated circuit device for example, small signals may be present on each conductor, even though it is grounded to the backstop member 110. Thereby signals may also be present on the switch output conductor 106 as a result of capacitance coupling between switch elements, i.e., capacitance coupling across the gap 114. These signals are also the result of non zero effective impedance in the backstop member 110 ground circuit and the relatively high, gigahertz, frequencies contemplated for the FIG. 1 switch. Moreover, as a corollary to this latter case (a corollary however largely unrelated to the gap 114), if one of the conductors 107 and 108 is connected to an output signal of some part of the integrated circuit device and the other to an input port of some part of the integrated circuit device then cross coupling between conductors 107 and 108 may exist by way of non zero effective impedance in the backstop member 110 ground circuit and the relatively high, gigahertz, frequencies contemplated for the FIG. 1 switch. Such coupling may also cause small signals to appear on the input port conductor 106.

Maintaining a minimum impedance path to a node of zero signal in the integrated circuit for backstop member 110 of course diminishes each of these capacitance coupled signal effects. Notwithstanding these notations of several possible capacitance coupling effects in the FIG. 1 switch it is contemplated that this FIG. 1 switch is most useful in the situation where conductor 106 is connected to a source of input signal and conductors 107 and 108 are output signal paths and the backstop member 110 is provided with such good low impedance grounding that little backstop member 110 signal and minimal capacitance coupling of this signal occur. Indeed it is this shunting of signal paths in the FIG. 1 switch 120 which provides one advantage of the present invention. Capacitance coupling effects are also diminished in the FIG. 1 switch by the fact that each of the signal conductors in the switch is often operated with low characteristic impedance, e.g. fifty ohms, with respect to ground or the zero signal node of the integrated circuit.

The gap 114 in the FIG. 1 switch is also significant with respect to determination of the electrostatic force needed for closing the FIG. 1 switch during use. This electrostatic force may be generated by application of an electrical potential between either of the conductors 107 and 108 and the conductor 106, a potential comprised of a direct current bias potential in combination with a radio frequency signal for example. Although mathematical expressions relating separation distance, applied voltage and generated force in an electrostatic force environment are known in the art, generally the larger gap 114 is made the lower the force between conductors 106 and 108 for example for a given bias voltage between conductors. This simple relationship in fact provides one justification for use of the backstop member 110 in the FIG. 1 switch, i.e., limitation of the gap 114 by the backstop member 110 serves to limit the voltage needed to close the switch 120. In addition to these capacitance coupling and energization voltage related aspects of the gap 114 this gap is also determinative of the breakdown limited maximum signal and bias voltages usable between conductors 106 and 108 for example when the switch 120 is in the FIG. 1 open configuration. In view of the shunted to ground condition of the conductor 108 and its movable arm portion 122 when the FIG. 1 switch is in the illustrated shunted open switch position, the signal and bias voltage needed to accomplish switch closure should appear on the conductor 106 and comprise a potential with respect to ground potential.

A more practical way to accomplish switch closure in the FIG. 1 switch is represented by the pull-down pads shown at 125 and 127 in the FIG. 1 drawing. These pads which are electrically insulated from each other element of the FIG. 1 switch and from each other may be used for application of a pull-down voltage and actuation of the movable arm portions 122 and 123. The individual actuation of movable arm portions 122 and 123 as espoused herein is enabled by the electrical isolation of the pads 125 and 127, however, concurrent actuation is of course possible if desired in some uses of the switch. Materials and fabrication of the pads 125 and 127 in the FIG. 1 switch may be similar to those of the similarly disposed and similarly functioning pads 521, 522, and 523 in the FIG. 5 drawing herein. The physical size of the pads 125 and 127 in FIG. 1 may of course be adjusted to suit individual switch requirements including consideration of force and voltage relationships and the available switch layout space.

CAPACATANCE SWITCHING

Figure 2:
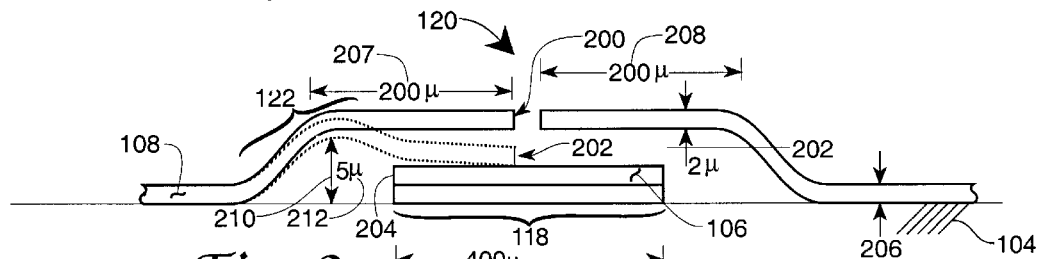
FIG. 2 shows an elevation view of a MEMS switch of the FIG. 1 type.

FIG. 2 in the drawings shows an elevation view of a multiple path MEMS switch of the FIG. 1 type when the switch is disposed in an electrically "On" condition for one output signal path, the conductor 108 path. In the FIG. 2 drawing the identification numbers assigned in the FIG. 1 drawing are reused to the best degree possible with new numbers in the two hundred series also being used as needed. In the FIG. 2 drawing the spring urged movable arm portion 122 of the switch 120 is shown in its relaxed non-actutated condition and is also shown by dotted lines, as indicated by the number 202, to have a deformed or non relaxed condition. The FIG. 1 relaxed condition of the movable arm portion 122 is indicated in full line form at 200 in the FIG. 2 drawing. The movable arm portion 123 of the FIG. 1 switch is shown in its relaxed non-actuated FIG. 1 position in the FIG. 2 drawing. The showing in FIG. 2 is in keeping with the above described consideration in which the present invention switch appears to have desirable utility in selecting one of several possible signal paths rather than several parallel paths concurrently.

In the FIG. 2 deformed condition of the movable arm portion 122 at 200 it may be noted that this arm portion comes to rest on an intermediate member, an insulating member 204, located between the conductors 106 and conductors 107–108. Presence of this intermediate insulating member 204 in the FIG. 1 and FIG. 2 switch 120 is in keeping with the fact that this switch may be operated in a capacitance-coupled mode rather than in the conventional ohmic connection mode between "closed" switch conductors. Indeed it is use of this capacitance coupled operating mode which enables the maintenance of a continuous electrostatic force generating voltage across the contacts of conductors 106 and 107 or 106 and 108 when the switch is in the FIG. 2 closed or "On" configuration and the pads 125 and 127 are not used. Without such capacitance coupling (and in the absence of using pads 125 and 127) the electrostatic force generating difference voltage would of course disappear with closure of the switch contacts and the switch conductors could operate in something of an oscillatory cycle. The intermediate insulating member 204 may be comprised of silicon nitride material of thickness in the range of two tenths to one quarter micron for example.

In the capacitance-coupled operating mode of switch 120 it is of course the difference between conductor 106 to conductor 108 capacitance coupling, in the conductor overlap of region 118, which determines the switch output signal difference between the "Off" and "On" switch configurations. Indeed this capacitance difference dependency standing alone suggests making the open switch gap 114 in FIG. 1 as large as possible in order to achieve the greatest degree of capacitance change in the FIG. 2 switch configuration. Use of capacitance coupling and capacitance coupling change also suggests making the overlapping parts of the FIG. 2 switch conductors, the parts indicated in region 118 in FIG. 1 and FIG. 2, as large as possible in both length and width dimensions. In a similar manner it is desirable for the insulating member 204 to have the smallest thickness possible in order to maximize the closed switch capacitance coupling in this mode. At the microwave or other radio frequencies contemplated for use of the present invention switch small capacitance values between "closed" contacts of the switch are sufficient for significant signal power transfer through the switch. At a frequency of 10 gigahertz for example a capacitance of 10 picofarads between "closed" contacts of the switch 120 provides a capacitive reactance of 1.59 ohms, an impedance sufficiently low for effective power transfer through a transmission line of fifty ohms characteristic impedance. Similarly in some uses of the present invention switch, capacitance coupling at the grounding backstop member 110 in FIG. 1 may be adequate for achieving the signal shunting function described herein. Of course capacitance coupling at the bastop member 110 may undesirably increase backstop member 110 grounding impedance in some switch appliations. In the FIG. 2 position of increased capacitive coupling between switch elements, a capacitance ratio of between fifty and two hundred times that of an open switch operating condition can be achieved.

Notwithstanding these "closed" contact capacitance coupling considerations it should be appreciated however that switches of the present invention type may within the scope of the invention employ either capacitance coupling or metal to metal ohmic connection between conductors disposed in the contact "closed" condition. Moreover a given switch according to the invention may employ a mixture of these capacitance and ohmic closed contact coupling modes. Herein the expression "close intimate spacing" is used to refer to these two different closed contact coupling modes (capacitance and ohmic) in a generic manner. Of course capacitance coupling at the backstop member 110 may undesirably increase backstop member 110 grounding impedance in some switch applications.

The FIG. 1 switch with its illustrated relatively small physical overlaps between the movable part of conductor 107 and the backstop member 110 and between conductor 107 and conductor 106 is for example well suited to the ohmic contact between "closed" switch conductors operating mode. In contrast the FIG. 5 switch herein is, as is explained below, well suited to operating modes employing either ohmic contact or capacitance coupling between "closed" contacts in the signal conductor or in the cantilever grounding paths.

Figure 4:
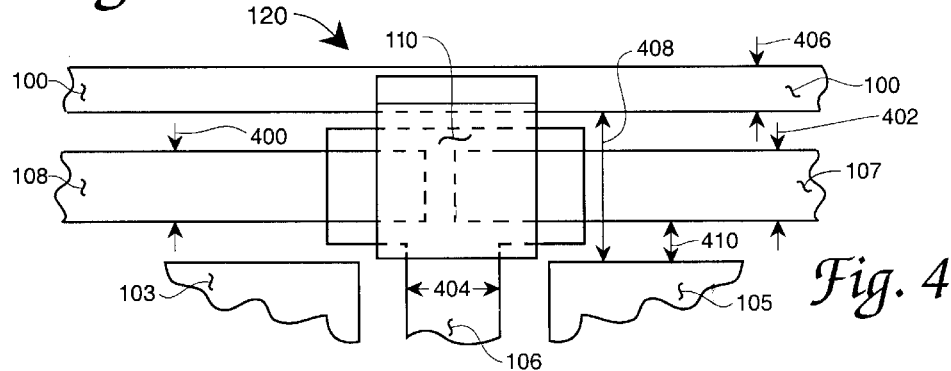
FIG. 4 shows a switch of the FIG. 3 type in a contemplated environment including representative switch dimensions.

Usable dimensions for several of these switch parts are show in the FIG. 2 drawing and include the 200 micron length indicated at 207 and 208 for the movable arm 122, insulating member 204 thickness of 100 microns (of silicon nitride or silicon dioxide materials for example), movable arm elevation of 5 microns as indicated at 210, and a metallization thickness dimension of 2 microns as indicated at 206. The conductor 106 dimension of 400 microns in the region 118 of conductor overlap in indicated at 214 in the FIG. 2 drawing. None of these dimensions is considered especially critical so long as the functions recited herein are maintained; in other words the dimensions shown in FIG. 2 may be considered typical or representative rather than limiting of the invention. The influence of switch dimensions on achievable switch operating life should however be considered in switch configurations departing significantly from that represented in FIG. 1 and FIG. 2. FIG. 4 in the drawings also shows switch dimensions, dimensions having characteristic impedance significance as is discussed subsequently herein.

Figure 3:
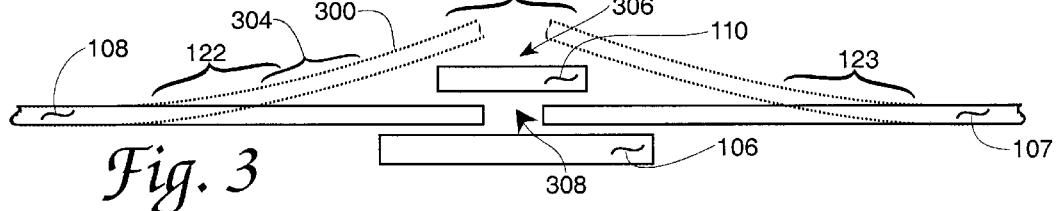
FIG. 3 shows additional features according to the present invention for the FIG. 1 and FIG. 2 switches.

The FIG. 2 drawing does not show the FIG. 1 backstop member 110 nor the expected behavior of the movable arm portion 122 in the absence of this backstop member 110; such omissions are believed enabling of a less cluttered and more easily understood FIG. 2 drawing and its additions to the invention description. FIG. 3 in the drawings corrects this FIG. 1 omission by showing an elevation cross sectional view of both the backstop member 110 and the movable arm portion 122 as the arm portion 122 would exist in the absence of backstop member 110. In the FIG. 3 drawing therefore the movable arm portion 122 is shown in dotted line form at 300 to be in the position it would assume in a switch open operating condition without the presence of backstop member 110. The curvature at 304 in the movable arm portion 122 in FIG. 3 indicates the degree of spring tension remaining in the arm after its fabrication and also suggests the force required from the electrostatic potential applied across switch 120 to achieve switch closure. In fact with the elevation plane switch element dimensions shown in FIG. 2 and with a movable arm portion 122 of some 50 microns width in its lateral direction (in the direction represented at 400 in FIG. 4) the achieved spring tension force tending to generate the FIG. 3 illustrated curvature at 304 is believed to be in the range of 0.4 to 1.8 micronewtons.

FIG. 3 also provides a second view of the FIG. 1 switch 120 with the movable arm portions 122 and 123 in their open switch positions, the positions represented at 302 in FIG. 3, wherein for example contact between the movable arm portion 122 and the backstop member 110 tends to occur in a normal switch structure. As may be observed in the FIG. 3 drawing, the cross sectional size of the backstop member 110 is preferably made sufficiently large to prevent its deformation from spring tension in the movable arm portions 122 and 123 or from die handling during a fabrication process. Usable width and height dimensions for the backstop member bridging or suspended portion at 306 are 100 microns and ten microns respectively in a switch having the other dimensions recited above. The representations of movable arm portions 122 and 123 at 308 in FIG. 8 indicates the more normal switch condition wherein movable arm portions 122 and 123 are held "captive" by the backstop member 110 and are disposed in at least a partially closed switch condition.

FIG. 4 in the drawings shows a plan view of a switch of the FIG. 1–3 type in a contemplated environment and also shows additional representative switch-related dimensions. In the FIG. 4 drawing the grounded transmission line conductors 103, 104 and 105 of FIG. 1 are shown on either side of the fixed position conductor 106 and in spaced relationship with the signal conductors 107 and 108 and the ground conductor 100. In FIG. 4 the grounded conductor 100 provides both electrical continuity and physical support for the backstop member backstop member 110, a width dimension for this conductor is identified at 406 in FIG. 4. Representative dimensions appear at 404 in the FIG. 4 drawing for the fixed position conductor 106 and at 400 and 402 for the conductors 107 and 108. For the case of a transmission line of fifty ohms characteristic impedance employing the FIG. 2 disclosed two micron metal thickness, the FIG. 4 dimensions 400, 402, 404 and 406 may have values of 50 microns, 50 microns, 50 microns, and 100 microns respectively. The spacing between conductor 108 and each of conductors 100, 103 and 105 in the FIG. 4 drawing, the spacing 410 in FIG. 4, may be 35 microns. The related length dimension of the backstop member 110 in its bridge portion indicated at 408 may be 120 microns. As is known in the transmission line art, the FIG. 4 dimensions are interrelated in nature and may be altered as a set, to a limited degree while maintaining a selected characteristic impedance; this is of interest in adapting the switch of the invention to a differing integrated circuit geometry for example. Differing dimensions may be used to obtain a transmission line of different characteristic impedance as is also known in the art.

Figure 6:
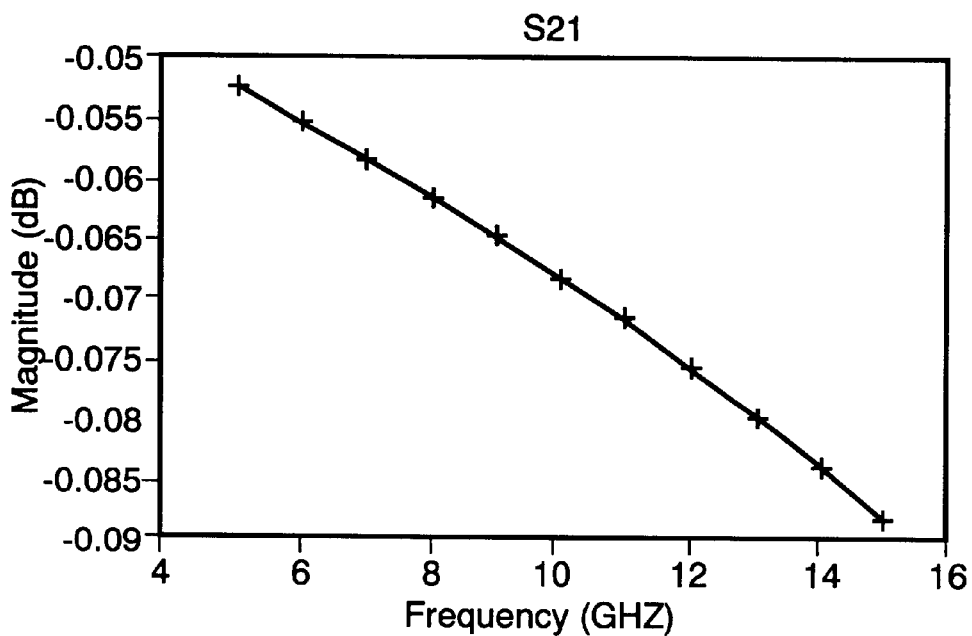
FIG. 6 shows "ON" state losses for the present invention MEMS switch and a partly similar previous arrangement MEMS switch.

The grounded bridge contact or backstop member 110 provides a notable contribution to the MEMS RF switch of FIGS. 1–4. One aspect of this contribution is a significant increase in the switch input to output isolation and to the between outputs isolation when the switch is in the "Off" state. This isolation is present while maintaining an insertion loss of less than 0.1 dB at frequencies between direct current and 15 gigahertz as shown in FIG. 6 of the drawings. The FIG. 6 curve represents simulation-determined S-parameter "On" state isolation for a switch of the present invention type. The FIG. 6 indicated S21 parameter shows the isolation occurring between a signal applied at one port of a switch (port 2 or the conductor 106 in FIG. 1 for example) and the signal measured at another port of the switch, (port 1 or the conductor 108 in FIG. 1 for example). The relatively low isolation magnitude represented in FIG. 6 indicates most of the port 2 applied signal reaches the port 1 switch output as desired.

Figure 7:
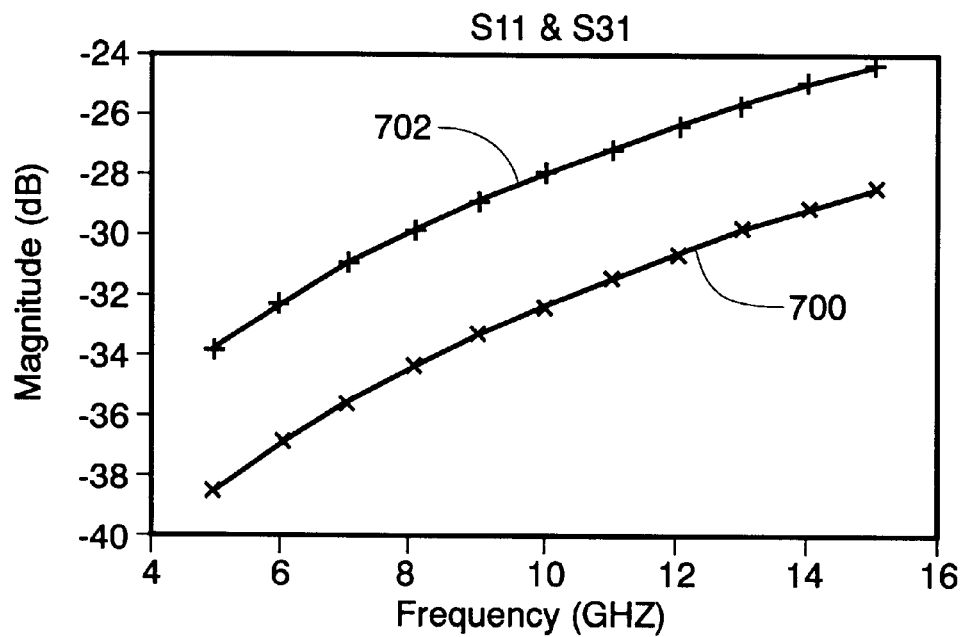
FIG. 7 shows "OFF" state losses for the present invention MEMS switch and a partly similar previous arrangement MEMS switch.

The FIG. 7 curves each represent simulation-determined S-parameter "Off" state characteristics for a switch of the present invention type. The lowermost FIG. 7 curve at 700, a curve representing a S11 switch parameter, shows the signal reflected back along input conductor 106 in FIG. 1 for example under open switch conditions. The curve 700 relates to a present invention switch having the backstop member 110 present and having grounded movable arm portions 122 and 123. This curve 700 shows the reflected signal to be of small magnitude indicating a good match condition. The curve at 702 in FIG. 7 relates to a switch of the FIG. 1 type and shows the coupling between switch input and output ports when the switch is in an open condition. The relatively small degree of signal coupling represented by the curve 702 largely demonstrates the shunting benefits of the present invention backstop member 110 in achieving switch input port to output port isolation. The curves of FIG. 6 and FIG. 7 are obtained with ohmic connection conditions between "closed" switch contacts.

In summary the FIG. 1 through FIG. 4 embodiment of the invention provides a multiple path MEMS radio frequency switch having two or more normally output port cantilever beam members anchored at one end thereof to a substrate and positioned above a normally switch input port contact.

(Reversal of these normal port designations is of course possible.) A grounded bridge contact or backstop member 110 positioned at the free end of and above the free cantilever beam ends makes contact with the top of each beam when the switch is in the relaxed or "Off" or shunted open state. The grounded bridge contact above the cantilever beam ends provides improved isolation and low loss characteristics for the radio frequency switch. The switch relies upon the intrinsic residual stress gradient of metallization used to form the cantilever beams to cause each beam to curl upwards and contact the grounded backstop member 110 when the switch is in the "OFF" position. The backstop member 110 limits the upward deflection of each cantilever beam, allowing it to be electrostatically actuated to the down, or "ON" position with a low dc voltage of less than twenty five volts. The actuation voltage may be applied to a separate pull-down electrode for each output path cantilever beam.

Figure 5:
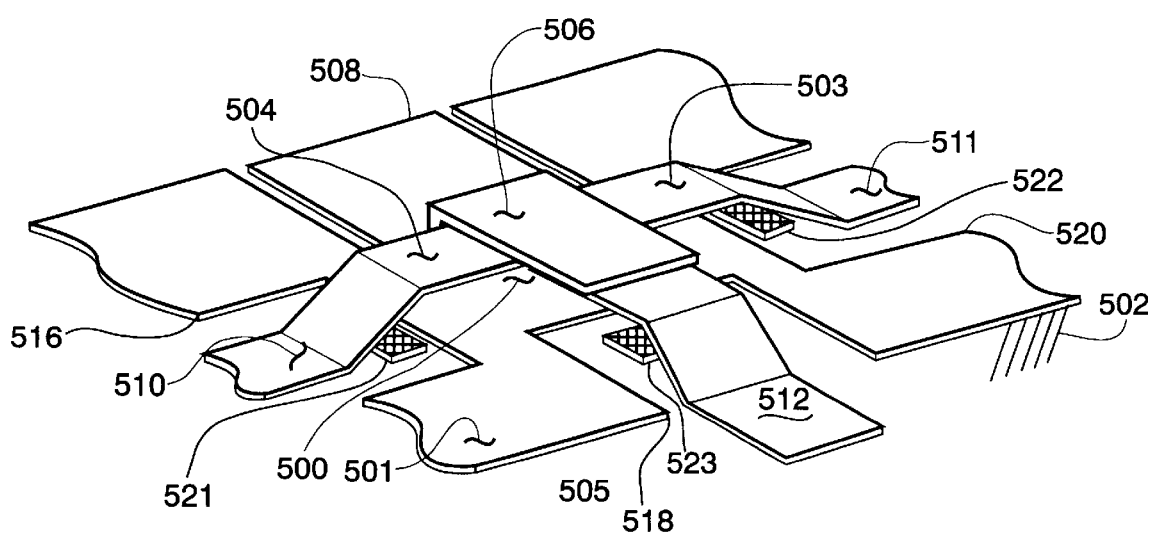
FIG. 5 shows another arrangement of a MEMS switch according to the invention.

FIG. 5 in the drawings shows a three dimensional perspective view of a second multiple path MEMS metallic integrated circuit electrical switch according to the present invention. The FIG. 5 switch is also a series-shunt MEMS switch however this switch differs in several respects from the above described switch of FIG. 1 through FIG. 4. A first blush difference in the FIG. 5 switch concerns the fact that the shunt ground switch contact, the contact located in the region 500 in FIG. 5, is not implemented in the form of a microbridge or the backstop member 110 in FIG. 1. Instead, the ground contact 500 in the FIG. 5 switch is planar in nature and resides on the switch substrate 502 and is in fact merely a part of or an extension of the ground plane conductor 501 in the FIG. 5 assembly. Notably this ground plane conductor in the FIG. 5 switch is notched or recessed in the regions 516, 518 and 520 to accommodate the switch output conductors and their movable cantilever beam portions.

Another notable difference between the FIG. 5 switch and the FIG. 1 arrangement of the invention concerns the fact that the FIG. 5 switch includes three selectable output ports or paths, the paths indicated at 510, 511 and 512 in FIG. 5. The output conductor for each of these paths is connected to either the input port conductor 506 and its attached backstop member 110 or to the ground contact 500 according to the multiple switch path selection made. The FIG. 5 illustrated three output port configuration is of course but one of several different possible arrangements of the FIG. 5 configuration of the present invention, clearly a two, three and possibly four or five or more output port arrangement of the switch can be achieved with careful physical layout of the switch elements and consideration of the more limited ground plane areas and ground plane conductor cross sections thereby made available. Such ground plane limitations, although considered one of the more ultimate limitations of output port numbers in the FIG. 5 switch, may be diminished in significance through use of underlying or overlaying ground plane conductors or surrounding ground plane conductors in the FIG. 5 or other versions of the present invention switch.

Another notable difference between the FIG. 5 switch and the FIG. 1 arrangement of the invention concerns the fact that in the FIG. 5 switch each movable arm switch element such as the movable cantilever arm 504 makes contact with the ground 500 when it is actuated or pulled down into the switch "Off" state. When in the up or "On" state, the cantilever arm 504 is in contact with the backstop member 506 connected to the input transmission line conductor 508. The FIG. 5 switch configuration is therefore different in that the switch is normally in the "On" state and must be actuated, or the movable cantilever arm 504 pulled down, to be in the "Off" state. Each of the three cantilever arms 503, 504 and 505 is of this normally "On" disposition in the FIG. 5 switch however some mixture of normally "On" and normally "Off" cantilever arms is considered within the scope of the disclosed invention.

Another difference in the FIG. 5 switch concerns the presence of the pull-down electrodes 521, 522 and 523 in the FIG. 5 switch. In the environment of a fifty ohm characteristic impedance for the conductors 506, 508, 510, 511 and 512 a significant current flow, i.e., a current near one half ampere, through a single resistive load connected with the FIG. 5 switch would be required in order to develop a twenty five volt switch actuation voltage on the switch electrodes themselves-in the manner of the FIG. 1 switch. (If each of conductors 506, 508, 510, 511 and 512 is connected to a characteristic resistive impedance of fifty ohms a twenty five volt pull-down voltage requires a two and one half ampere total current flow through the paralleled resistive impedances to accomplish actuation of all cantilever arms 503, 504 and 505.) Use of the pull-down electrodes 521, 522 and 523 enables the switch actuation voltage to be applied between one of these electrodes and the movable cantilever arm without incurring current flows of this magnitude.

The pull-down electrodes 521, 522 and 523 may consist of a thin layer of metal received on a surface layer of electrical insulation ultimately supported by substrate 502. This thin layer of metal is preferably covered by an overcoating thin layer of insulating material such as silicon nitride, a layer of about two tenths of a micron thickness. Electrical signal to accomplish FIG. 5 switch actuation may be applied to the thin layer of metal by way of a conductive path of similar metal or by way of an electrically resistive path leading into each of electrodes 521, 522 and 523. Use of the electrodes 521, 522 and 523 in the FIG. 5 switch of course permits the desired individual selection of any one of cantilever arms 503, 504 and 505 for actuation or, in the less likely multiple output port case of FIG. 5 switch application, selection of all cantilever arms 503, 504 and 505 for simultaneous actuation.

Even though the switch of FIG. 5 may therefore be considered to be a "normally ON" switch and the FIG. 1 through FIG. 4 switch a "normally OFF" switch the electrical and mechanical switching performance of each configuration is similar. Both switches have the desired low insertion loss and high isolation characteristics and each has similar movable element dimensions, spring constant considerations and actuation force and voltage needs. The FIG. 5 switch arrangement can require additional not shown physical support for the bridge element 506 in some instances however this can be provided by conventional integrated circuit techniques. The "normally ON" characteristics of the FIG. 5 switch can of course be of advantage in electrical circuit uses wherein for example maintenance of a signal path is desired even during a non energized or start-up state of the apparatus.

The FIG. 5 switch arrangement can also offer operating advantage with respect to electrical impedance inherently present in the backstop member 110 of the FIG. 1 through FIG. 4 switch since in the FIG. 5 arrangement, the switch shunting ground conductor is planar, short and direct in disposition rather than having the elevated, inherently greater inductance and higher ground impedance configuration of the FIG. 1 through FIG. 4 switch. This difference can provide an improved signal shunting characteristic over the FIG. 1 through FIG. 4 switch in higher operating frequency, sensitive circuit uses of the FIG. 5 switch.

The FIG. 5 embodiment of the invention may be disposed to operate in either the capacitance coupling between "closed" contacts or the ohmic connection between "closed" contacts modes described above in connection with FIG. 2. If arranged for the capacitance coupling between "closed" contacts mode of operation, thin layers of insulation, as described above in connection with layer 204 in FIG. 2, are to be used with one or both of the backstop member 506 and ground contact 500. A metal oxide layer or its equivalent may also be used to form an insulating layer on one or both closeable contacts of the switch. The pull down electrodes 521 and 523 of course support either of the capacitance and ohmic contact operating modes for the FIG. 5 switch.

The FIG. 5 embodiment of the invention therefore provides a normally "On" or normally closed multiple path MEMS radio frequency switch having movable cantilever beam switching members each anchored on one end to a substrate and positioned below a normally closed contact positioned above the cantilever arm free ends. A grounded contact positioned below the free ends of the cantilever beams makes contact with the bottom of the beam when the switch is in each actuated closed, shunting, down, or open, or "Off" switch state. The grounded contact below the cantilever beam free ends provides improved isolation and low loss characteristics for the radio frequency switch in each "Off" position it may assume. The FIG. 5 switch relies upon the intrinsic residual stress gradient of metallization used to form each cantilever beam to cause the beam to curl upwards and contact the input conductor backstop member (i.e., a second or fixed cantilever beam) when the switch is in the quiescent "ON" position. The backstop member limits the upward deflection of the cantilever beam members, allowing each to be electrostatically actuated to the down, or "OFF" position with a low dc voltage, a voltage of less than twenty five volts. The actuation voltage is preferably applied to separate pull-down electrodes located immediately below some portion of each movable cantilever beam.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. Normally open multiple ported integrated circuit radio frequency transmission line metallic mechanical electrical switching apparatus comprising the combination of:

an integrated circuit substrate member;

a plurality of semiconductor material layers disposed on said substrate member, said semiconductor material layers comprising a plurality of electrical transistor members;

an array of spaced apart metallic transmission line ground member elements residing on an upper surface portion of said semiconductor material layers;

a metallic first radio frequency energy transmission line signal conveying member disposed intermediate elements of said metallic transmission line ground member array on said upper surface portion of said semiconductor material layers;

said metallic first radio frequency energy transmission line signal conveying member interconnecting a switch contact area on said surface portion of said semiconductor material layers with one of a transmission line radio frequency source and load member;

a second metallic radio frequency energy transmission line signal conveying member disposed intermediate elements of said metallic transmission line ground member array on said upper surface portion of said semiconductor material layers;

a third metallic radio frequency energy transmission line signal conveying member disposed intermediate elements of said metallic transmission line ground member array on said upper surface portion of said semiconductor material layers;

said second and third metallic radio frequency energy transmission line signal conveying members each including a selectively movable portion extending in segregated overlap over a part of said first metallic radio frequency energy transmission line signal conveying member and normally resident in open switch spring biased physical segregation from said metallic first radio frequency energy transmission line signal conveying member and said upper surface portion of said semiconductor material layers and said substrate member;

said second and third metallic radio frequency energy transmission line signal conveying members being individually movable into positions of close intimate spacing with respect to said first metallic radio frequency energy transmission line signal conveying member during individual energized, closed switch operating conditions;

a raised metallic backstop member extending from one of said metallic transmission line ground members over said selectively movable portions of said second and third radio frequency energy transmission line signal conveying members; said backstop member being engaged by and grounding said selectively movable portions of said second and third metallic radio frequency energy transmission line signal conveying members in said spring biased open switch condition thereof;

first electrostatic force generating electrical potential apparatus connected between said first metallic radio frequency energy transmission line signal conveying member and said second metallic radio frequency energy transmission line signal conveying member and selectively generating an electrical potential achieving said individual energized, closed switch operating condition of said second metallic radio frequency energy transmission line signal conveying member;

second electrostatic force generating electrical potential apparatus connected between said first metallic radio frequency energy transmission line signal conveying member and said third metallic radio frequency energy transmission line signal conveying member and selectively generating an electrical potential achieving said individual energized, closed switch operating condition of said third metallic radio frequency energy transmission line signal conveying member.

2. The normally open multiple ported integrated circuit radio frequency transmission line metallic mechanical electrical switching apparatus of claim 1 wherein said first and second electrostatic force generating electrical potential apparatus comprise a source of direct current electrical bias summed with a source of said radio frequency energy.

3. The normally open multiple ported integrated circuit radio frequency transmission line metallic mechanical electrical switching apparatus of claim 1 wherein said substrate member and said semiconductor material layers are comprised of one of the materials of silicon and gallium arsenide.

4. The normally open multiple ported integrated circuit radio frequency transmission line metallic mechanical electrical switching apparatus of claim 1 wherein said metallic transmission line ground members and said metallic first, second and third radio frequency energy transmission line signal conveying members comprise coplanar transmission line elements.

5. The normally open multiple ported integrated circuit radio frequency transmission line metallic mechanical electrical switching apparatus of claim 1 wherein one of said movable second and third metallic radio frequency energy transmission line signal conveying members is connected with a radio frequency energy load member.

6. The normally open multiple ported integrated circuit radio frequency transmission line metallic mechanical electrical switching apparatus of claim 1 wherein said movable second and third metallic radio frequency energy transmission line signal conveying members are orthogonally disposed with respect to said first radio frequency energy transmission line signal conveying member in said upper surface portion of said semiconductor material layers.

7. The normally open multiple ported integrated circuit radio frequency transmission line metallic mechanical electrical switching apparatus of claim 1 wherein each of said first and second electrostatic force generating electrical potential apparatus generate an electrical potential of less than twenty five volts.

8. The normally open multiple ported integrated circuit radio frequency transmission line metallic mechanical electrical switching apparatus of claim 1 wherein said energized, closed switch operating condition position of close intimate spacing between each of said movable second and third metallic radio frequency energy transmission line signal conveying members and said first metallic radio frequency energy transmission line signal conveying member has a capacitance fifty to one hundred times greater than an open switch condition.

9. Metallic mechanical integrated circuit radio frequency transmission line electrical switching apparatus comprising the combination of:

an integrated circuit substrate member;

a plurality of semiconductor material layers disposed on said substrate member, said semiconductor material layers comprising a plurality of electrical transistor members;

an array of spaced apart metallic transmission line ground member elements residing on an upper surface portion of said semiconductor material layers;

a metallic first radio frequency energy transmission line signal conveying member disposed intermediate elements of said metallic transmission line ground member array on said upper surface portion of said semiconductor material layers;

said metallic first radio frequency energy transmission line signal conveying member interconnecting a switch overlap area on said surface portion of said semiconductor material layers with one of a transmission line radio frequency source and load members;

a metallic second radio frequency energy transmission line signal conveying member disposed intermediate elements of said metallic transmission line ground member array on said upper surface portion of said semiconductor material layers;

a metallic third radio frequency energy transmission line signal conveying member disposed intermediate elements of said metallic transmission line ground member array on said upper surface portion of said semiconductor material layers;

said second and third metallic radio frequency energy transmission line signal conveying members each including a selectively movable portion overlapping segregated portions of said first metallic radio frequency energy transmission line signal conveying member in said overlap area;

a metallic bridge member extending upward over said selectively movable portions of said second and third metallic radio frequency energy transmission line signal conveying members in said overlap area from one of:
  said first metallic radio frequency energy transmission line signal conveying member; and
  one of said metallic transmission line ground member elements;

said second and third metallic radio frequency energy transmission line signal conveying members each being normally resident in one of:
  open switch relaxed spring physical segregation from said upper surface portion of said semiconductor material layers and said substrate member and interconnected via said metallic bridge member with one of said metallic transmission line ground member elements; and
  closed switch relaxed spring physical segregation from said upper surface portion of said semiconductor material layers and said substrate member in close intimate spaced coupling with said first radio frequency energy transmission line signal conveying member via said metallic bridge member;

first electrostatic force generating electrical potential apparatus connected between said first metallic radio frequency energy transmission line signal conveying member and said second metallic radio frequency energy transmission line signal conveying member and selectively generating an electrical potential achieving an energized, closed switch operating condition of said second metallic radio frequency energy transmission line signal conveying member with said first radio frequency energy transmission line signal conveying member;

second electrostatic force generating electrical potential apparatus connected between said first metallic radio frequency energy transmission line signal conveying member and said third metallic radio frequency energy transmission line signal conveying member and selectively generating an electrical potential achieving an energized closed switch operating condition of said third metallic radio frequency energy transmission line signal conveying member with said first radio frequency energy transmission line signal conveying member.

10. The metallic mechanical integrated circuit radio frequency transmission line electrical switching apparatus of claim 9 wherein said switching apparatus comprises a normally open electrical switch and wherein:

said metallic bridge member extending upward over said selectively movable portions of said second and third metallic radio frequency energy transmission line signal conveying members extends from one of said metallic transmission line ground member elements;

said second and third metallic radio frequency energy transmission line signal conveying members are each normally resident in open switch relaxed spring physical segregation from said upper surface portion of said semiconductor material layers and said substrate member proximate said metallic bridge member.

11. The metallic mechanical integrated circuit radio frequency transmission line electrical switching apparatus of claim 9 wherein said switching apparatus comprises a normally closed electrical switch and wherein:

said metallic bridge member extending upward over said selectively movable portions of said second and third metallic radio frequency energy transmission line signal conveying members extends from said first metallic radio frequency energy transmission line signal conveying member; and said second and third metallic radio frequency energy transmission line signal conveying members are each normally resident in closed switch relaxed spring physical segregation from a ground plane element resident thereunder on said upper surface portion of said semiconductor material layers and said substrate member and proximate said metallic bridge member.

12. The metallic mechanical integrated circuit radio frequency transmission line electrical switching apparatus of claim 9 further including:

a metallic fourth radio frequency energy transmission line signal conveying member disposed intermediate elements of said metallic transmission line ground member array on said upper surface portion of said semiconductor material layers;

said fourth metallic radio frequency energy transmission line signal conveying member including a selectively movable portion overlapping segregated portions of said first metallic radio frequency energy transmission line signal conveying member in said overlap area: and a third of said electrostatic force generating electrical potential apparatus.

13. The metallic mechanical integrated circuit radio frequency transmission line electrical switching apparatus of claim 9 wherein:

said first metallic radio frequency energy transmission line signal conveying member is a switch input node member;

said first metallic radio frequency energy transmission line signal conveying member interconnects with a transmission line radio frequency source; and said second and third metallic radio frequency energy transmission line signal conveying members are switch output node members each interconnected with a transmission line radio frequency load.

14. The method of performing electrical switching in a metallic conductor signal path of a radio frequency integrated circuit electrical device, said method comprising the steps of:

disposing an electrical switching assembly at an angular junction multiple conductor fan-out position along a metallic transmission line signal path in said radio frequency integrated circuit electrical device;

holding a spring urged movable metallic portion of each conductor in said multiple conductor fan-out position of said electrical switching assembly in a relaxed minimal spring tension first switching condition during quiescent state intervals of said electrical switching assembly;

changing one spring urged movable metallic conductor portion in said multiple conductor fan-out position of said electrical switching assembly into a stressed greater spring tension transient state second switching condition during selected transient actuated switch operating intervals of said electrical switching assembly;

changing said movable metallic conductor portion switching position against spring tension into said stressed greater spring tension transient state second switching condition using electrostatic force generated by an electrical potential switch control signal;

limiting spring tension urged movable metallic conductor movement arc length and movable metallic conductor element spacing gap in said electrical switching assembly during a relaxation from said second switching condition to said first switching condition using a metal stopping member selectively disposed along a switch position-changing swing path of said movable metallic conductor;

coupling radio frequency electrical signal between said movable metallic conductor-electrical switching member and a switch output conductor member using one of capacitance and ohmic coupling between said switching member and a switch output conductor member in one of said first and second switching conditions;

limiting capacitance electrical signal coupling between said movable metallic conductor electrical switching member and said switch output conductor member by one of capacitance coupled and ohmic contact grounding of said movable metallic conductor electrical switching member to a zero electrical potential metal stopping member in a remaining of said first and second switching conditions;

said first and second switching conditions comprising one of:

a normally open condition in said electrical switching assembly including lowest capacity coupling between said movable metallic conductor electrical switching member and said switch output conductor member plus concurrent grounding by one of capacitance coupled and ohmic contact grounding of said movable metallic conductor member to said zero electrical potential metal stopping member; and a normally closed condition in said electrical switching assembly including greatest capacity coupling between said movable metallic conductor electrical switching member and said switch output conductor member plus actuated switch grounding by one of capacitance coupled and ohmic contact grounding of said movable metallic conductor member to said zero electrical potential metal stopping member;

repeating said step of changing one spring urged movable metallic conductor portion in said multiple conductor fan-out position of said electrical switching assembly into a stressed greater spring tension transient state second switching condition using a selected one of said spring urged movable metallic conductor portions.

15. The method of performing electrical switching in a metallic conductor path of a radio frequency integrated circuit electrical device metallic conductor of claim 14 wherein:

said movable metallic conductor-inclusive electrical switching member quiescently resides in a normally open electrical switching condition;

said step of limiting spring tension urged movable metallic conductor movement arc and switch element spacing gap includes spring tension urging of said movable metallic conductor away from said switch output conductor member into proximity with an overhanging grounding potential metal stopping member while entering said normally open electrical switching condition.

16. The method of performing electrical switching in a metallic conductor path of a radio frequency integrated circuit electrical device metallic conductor of claim 14 wherein:

said movable metallic conductor-inclusive electrical switching member quiescently resides in a normally closed electrical switching condition;

said step of limiting spring tension urged movable metallic conductor movement arc and switch element spacing gap includes spring tension urging of said movable metallic conductor away from a grounding electrical stop member and into proximity with an overhanging location of said switch output conductor member while entering said normally closed electrical switching condition.

17. The method of performing electrical switching in a metallic conductor path of a radio frequency integrated circuit electrical device metallic conductor of claim 14 wherein a first of said movable metallic conductor electrical switching member and said switch output conductor member comprises a source of radio frequency energy and a second of said members comprises a radio frequency load connection and wherein said step of limiting capacitance-accomplished electrical signal coupling comprises one of the steps of shunt loading said source of radio frequency energy and shunt paralleling a signal load member.

18. The method of performing electrical switching in a metallic conductor path of a radio frequency integrated circuit electrical device metallic conductor of claim 14 further including the step of operating said integrated circuit electrical device at an operating frequency in the range of direct current to greater than ten gigahertz.

19. The method of performing ohmic electrical switching in a metallic conductor signal path of a radio frequency integrated circuit electrical device, said method comprising the steps of:

disposing an electrical switching assembly at an angular junction multiple conductor fan-out position along a metallic transmission line signal path in said radio frequency integrated circuit electrical device;

holding a spring urged movable metallic portion of each conductor in said multiple conductor fan-out position of said electrical switching assembly in a relaxed minimal spring tension first switching condition during quiescent state intervals of said electrical switching assembly;

changing one spring urged movable metallic conductor portion in said multiple conductor fan-out position of said electrical switching assembly into a stressed greater spring tension transient state second switching condition during selected transient actuated switch operating intervals of said electrical switching assembly;

changing said movable metallic conductor portion switching position against spring tension into said stressed greater spring tension transient state second switching condition using electrostatic force generated by an electrical potential switch control signal;

limiting spring tension urged movable metallic conductor movement arc length and movable metallic conductor element spacing gap in said electrical switching assembly during a relaxation from said second switching condition to said first switching condition using a metal stopping member selectively disposed along a switch position-changing swing path of said movable metallic conductor;

coupling radio frequency electrical signal between said movable metallic conductor-electrical switching member and a switch output conductor member using ohmic contact coupling achieved between said switching member and a switch output conductor member in one of said first and second switching conditions;

limiting capacitance electrical signal coupling between said movable metallic conductor electrical switching member and said switch output conductor member by ohmic connection grounding of said movable metallic conductor electrical switching member to a zero electrical potential metal stopping member in a remaining of said first and second switching conditions;

said first and second switching conditions comprising one of:

a normally open condition in said electrical switching assembly including lowest capacity coupling between said movable metallic conductor electrical switching member and said switch output conductor member plus concurrent ohmic connection grounding of said movable metallic conductor member to said zero electrical potential metal stopping member; and a normally closed condition in said electrical switching assembly including ohmic connection grounding of said movable metallic conductor member to said zero electrical potential metal stopping member;

repeating said step of changing one spring urged movable metallic conductor portion in said multiple conductor fan-out position of said electrical switching assembly into a stressed greater spring tension transient state second switching condition using a selected one of said spring urged movable metallic conductor portions.

* * * * *